March 21, 1933.  W. GOETZELMAN  1,902,229
PIPE CONNECTER
Filed July 30, 1931
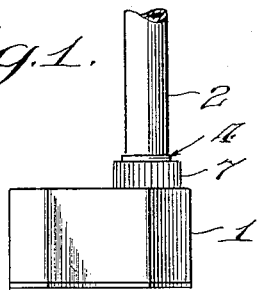
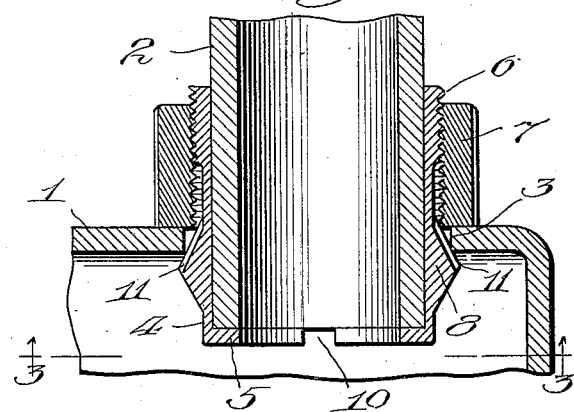
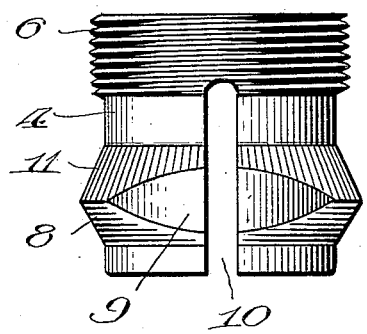
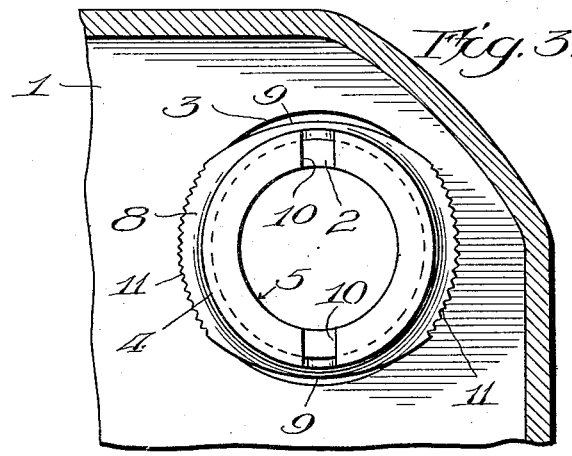
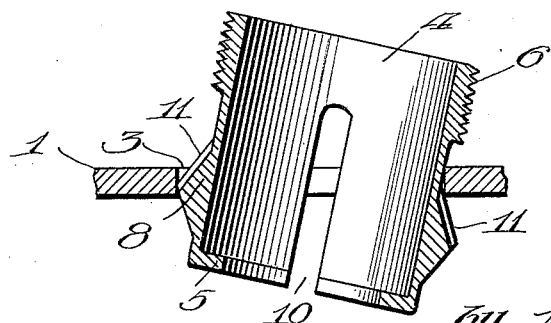
Inventor:
William Goetzelman,
By Wm. F. Freudenreich,
Atty Patented Mar. 21, 1933

1,902,229

UNITED STATES PATENT OFFICE

WILLIAM GOETZELMAN, OF CHICAGO, ILLINOIS, ASSIGNOR TO APPLETON ELECTRIC COMPANY, A CORPORATION OF ILLINOIS

PIPE CONNECTER

Application filed July 30, 1931. Serial No. 553,985.

The present invention has for its object to produce simple and novel means for effectively connecting a pipe or the like to a box or other member.

In the case of pipes connected to outlet or connection boxes in electrical installations, it is necessary that the pipes be in good electrically conductive relation to the boxes. Viewed in one of its aspects, the present invention may be said to have for its object to produce a simple and novel device for securing a pipe to an outlet or connection box and at the same time affording a good electrically conductive union between the pipe and box.

It is often necessary to fasten pipes to connection boxes after the latter have been nailed to a form upon which concrete is to be poured. Viewed in another of its aspects, the present invention may be said to have for its object to produce a simple and novel connecter whereby a pipe may be effectively joined to a box by means applied from the exterior of the box, thereby permitting a connection to be made between a pipe and a box that has been fastened down so that ready access cannot be had to the interior thereof.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of a box having a pipe connected thereto in accordance with the present invention; Fig. 2 is a section, on a larger scale, taken on a plane containing the long axis of the pipe, and showing fragments of the pipe and box, together with the improved connecter; Fig. 3 is a section on line 3—3 of Fig. 2; Fig. 4 is a side view of the sleeve element of the connecter; and Fig. 5 is a section through the sleeve and a fragment of the box, on a plane containing the long axis of the sleeve, showing the sleeve in the process of being inserted in an opening in the box from without the box.

My invention may be utilized to secure a pipe or the like to boxes of any kind or to walls or other members having openings through the same. In the drawing, I have illustrated my invention as a connecter employed in securing a pipe to the botom of an inverted box; the box 1 that I have illustrated being of a well known type. The pipe 2 or the like is adapted to extend into an opening 3 in the bottom wall of the box; this being one of the knockout openings usual in boxes of this kind. The pipe is considerably smaller in diameter than the opening 3.

In accordance with my invention, the connecting link between the pipe and the box is a metal sleeve 4 which preferably has at one end an internal flange 5 against which one end of the pipe may be seated; the external diameter of the sleeve being such that it may readily be inserted in the opening of the box. At the opposite end, which is the outer end of the sleeve when the parts are assembled, are external screw threads 6 adapted to be engaged by a thick nut 7 large enough to span the opening 3 and engage with the bottom of the box. The sleeve has thereon, remote from the screw-threaded end, a wedge element producing an enlargement of the sleeve; the base of the wedge element being farthest from the screw-threaded end of the sleeve. This wedge element is of such size and shape that a transverse dimension of the sleeve across the wedge element is larger than the diameter of the opening in the box. Consequently, when the sleeve is inserted in the opening, with the wedge element within the box, the sleeve cannot be drawn out through the hole by a straight pull. In the preferred form of my invention, I so design the wedge element that it is possible to withdraw the sleeve from the box in the outward direction under certain conditions. Where the sleeve is to extend through a round hole, as shown, the wedge element is preferably so shaped and proportioned that it may pass through the opening upon the tilt of the sleeve out of its normal position at right angles to the bottom wall of the box; but, when the sleeve stands at right angles to the bottom of the box, the wedge element will not pass through the opening. Perhaps the simplest form of wedge device is obtained by enlarging the sleeve at some distance from the screw-threaded end, to produce a tapered section in the form of a frustum of a cone 8 whose base is farthest from the screw-threaded end. The largest diameter of the cone is greater than the diameter of the opening in the box. In order to permit the frusto-conical section to pass through the opening in the box, I mutilate it by flattening it at opposite sides, as indicated at 9, 9; thereby reducing the transverse dimension from one flattened side to the other until it is smaller than the diameter of the opening of the box. With this arrangement, the enlarged end of the sleeve can be passed through the opening in the box from outside of the box, by tilting the sleeve, as indicated in Fig. 5. Then, when the sleeve is straightened, to bring it at right angles to the wall of the box through which it extends, it cannot be withdrawn without first tilting it again.

It will thus be seen that, when the sleeve has been applied to the box, with the enlarged section on the inside and the screw-threaded part on the outside, the placing of the nut on the screw-threaded portion and the screwing of the same down until it rests on the bottom wall of the box will draw the sleeve up and force the wedge section into the opening in the box; thus tightly securing the sleeve to the box. It is not enough that the sleeve be anchored to the box, if it is also desired to fasten the pipe to the box. I, therefore, so construct the sleeve that it will contract upon and firmly grip the pipe as the screw is tightened. To this end I have divided the sleeve longitudinally through the wedge section to the adjacent end, leaving only the screw-threaded end intact. This can conveniently be accomplished by cutting comparatively wide slots 10, 10 lengthwise of the sleeve, at diametrically opposed points, from the inner end of the sleeve, through the wedge section and into the vicinity of the screw-threaded end. These slots preferably pass through the flattened portions of the frusto-conical section.

The sleeve having been inserted in the opening in the box, and the nut applied, as heretofore explained, the pipe is placed in the sleeve until it rests against the flange 5. Then the nut is further tightened, drawing the frusto-conical section farther into the opening in the box and consequently contracting the divided portion of the sleeve and causing it to grip the pipe. By properly proportioning the parts, the pipe may be caused to be held so firmly that it cannot become loosened and be displaced.

The unmutilated portions of the frusto-conical section of the sleeve are provided with sharp ridges 11 extending lengthwise thereof. It will be seen that, as the frusto-conical section is drawn upward or outward into the opening in the box, these ridges will be the first portions thereof to engage with the edge of the wall bounding the opening, and they will, therefore, bite into the same. The biting of the ridges into the metal of the box serves to lock the sleeve against rotation relatively to the box while the nut is being tightened, and it also serves to expose clean metal surfaces that will produce a good electrically conductive connection between the sleeve and the box; and, since the sleeve is pressed into intimate contact with the external surface of the pipe, the pipe and the box will be in good electrically conductive relation to each other.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a member having a round opening therein, a sleeve having a frusto-conical section whose large diameter is greater than the diameter of said opening, opposed sides of frusto-conical section being flattened to permit the said section to be passed through said opening large end first upon tilting said sleeve, said sleeve being divided longitudinally through said frusto-conical section to the end beyond the base of said section, and a nut on the other end of the sleeve adapted to engage with said member and draw said frusto-conical section into said opening and contract the divided portion of the sleeve.

2. In combination, a member having a round opening therein, a sleeve having a frusto-conical section whose large diameter is greater than the diameter of said opening, opposed sides of frusto-conical section being flattened to permit the said section to be passed through said opening large end first upon tilting said sleeve, said sleeve being divided longitudinally through said frusto-conical section to the end beyond the base of said section, and a nut on the other end of the sleeve adapted to engage with said member and draw said frusto-conical section into said opening and contract the divided portion of the sleeve, the unmutilated portions of the frusto-conical section of the sleeve having sharp ridges extending lengthwise thereof to bite into the edge of the member bounding the opening when the nut is tightened.

3. A device of the character described, comprising a sleeve having remote from one end an enlarged frusto-conical section whose base is farthest from said end, a nut on said end of the sleeve, the sleeve being divided lengthwise through said frusto-conical section to the opposite end, and said frusto-conical section being flattened on opposed sides.

4. A device of the character described, comprising a sleeve having remote from one end an enlarged frusto-conical section whose base is farthest from said end, a nut on said end of the sleeve, the sleeve being divided lengthwise through said frusto-conical section to the opposite end, said frusto-conical section being flattened on opposed sides, and the unmutilated portions of the frusto-conical section having sharp ridges extending lengthwise thereof.

5. A device of the character described, comprising a sleeve having remote from one end an enlarged frusto-conical section whose base is farthest from said end, opposed sides of said frusto-conical section being flattened, a nut on the aforesaid end of the sleeve, and there being slots extending lengthwise of the sleeve from the opposite end through the flattened sides of the frusto-conical section.

6. A device of the character described comprising a sleeve having remote from one end an external wedge face which recedes from the long axis of the sleeve as the distance from said end increases, the transverse dimension of the sleeve on a line at right angles to a diameter passing through said wedge face being smaller than the transverse dimension along said diameter, the sleeve being divided longitudinally from the opposite end inwardly past the zone in which the wedge face lies, and a nut screw-threaded on the first-mentioned end of the sleeve.

In testimony whereof, I sign this specification.

WILLIAM GOETZELMAN.